(No Model.)
H. CARMONT.
RESILIENT TIRE FOR WHEELS.
No. 597,313. Patented Jan. 11, 1898.
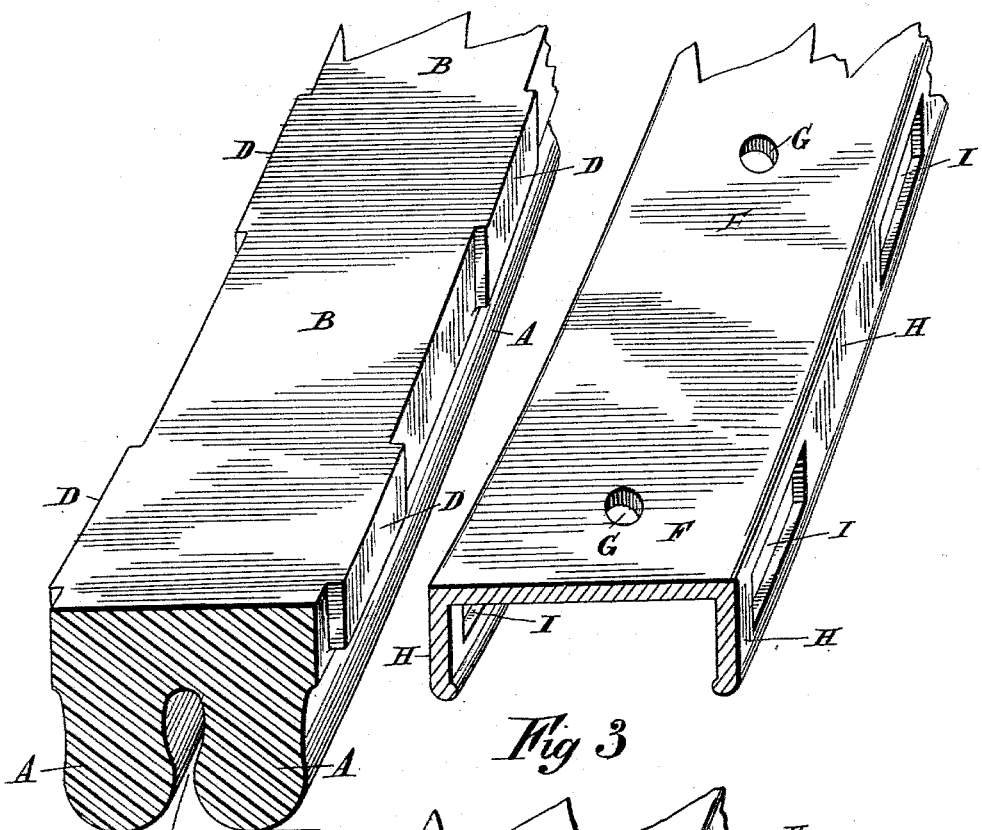

UNITED STATES PATENT OFFICE.

HAZELWOOD CARMONT, OF LONDON, ENGLAND.

RESILIENT TIRE FOR WHEELS.

SPECIFICATION forming part of Letters Patent No. 597,313, dated January 11, 1898.

Application filed September 27, 1897. Serial No. 653,197. (No model.)

*To all whom it may concern:*

Be it known that I, HAZELWOOD CARMONT, a subject of the Queen of Great Britain, residing at Helmsdale, Kingston-upon-Thames, London, in the county of Surrey, England, have invented certain new and useful Improvements in Resilient Tires for Wheels, of which the following is a specification.

This invention has for its object the construction of resilient tires for wheels that shall yield to all inequalities of a road and retain their resiliency during the life of the rubber and until worn down to the rim.

It is found in practice that where the rubber tire is fitted to a wheel and has to travel over a roadway provided with tram-rails the tire, should it get into the groove of the rail, rides upon the metal shoe or rim, and during the attempt to move out of the groove a side drag and swaging of the rubber occurs, which not only tends to shred the rubber, but is inclined to tear the rubber out of the rim before the rubber can rise to run on the rail. Again, where tram traffic is great the rails, from the weight of the cars and their loads, gradually sink below the level of the ordinary roadway, which from the lightness or distribution of the weight of other traffic has no crushing action upon said roadway. Consequently the road next the rails is of greater height, and this has been found to destroy the rubber of resilient wheels to a much greater extent than that from the rails.

Now the purport of my invention is to make a rubber tire with two circumferential ribs externally, with a central circumferential channel or groove, so that said tire appears like two separate rubber ribs secured in the same rim. Such a tire can never sink into the groove of a tram-rail. The tendency of the two ribs is to lean toward each other when under compression, and when being diverted from a tram-rail onto an ordinary road one rib, in yielding to side pressure of raised stones, presses against the next rib, which resists, and the first rib rides up to clear the obstacle.

In order that my double-ribbed rubber tire shall be held to the rim by self-attachment, I provide excrescences on each side of the base portion, and I make corresponding apertures or slots in the side wings of the metal rim which the excrescences are caused to enter when the tire is being fitted into the rim, so that the resilient tire is in a sense self-located and requires no other means of being secured, the whole of the rubber remaining resilient, there being no portion crushed in during the fitting. The rim may have inside edge beadings or be flat, and to get the rubber in place the base portion has only to be folded inwardly sufficient for the side excrescences to enter the side slots in the wings of the rim and it becomes located without the least risk of being torn away, except by purposely cutting it out.

To insure that the two ribs of the tire remain as distinct ribs, the central circumferential channel or groove has a metal ring inserted; but this is not a binding-wire, nor does it play any part in holding the tire on or in the rim. It simply serves to keep the ribs separate, and its diameter corresponds to the diameter of the tire at the bottom of the channel or groove.

My invention will be clearly understood by reference to the annexed drawings, in which—

Figure 1 is a detached perspective elevation of part of a resilient tire with side excrescences; Fig. 2, a perspective elevation of part of a rim with slot-apertures in the side wings; Fig. 3, my wheel-tire complete in a transverse section.

A A are two ribs projecting from a base-tire B; C, channel or groove between the ribs; D D, rectangular-shaped excrescences on the sides of the base B; F, flat of rim; G G, holes for rivet attachment to felly of wheel; H H, side wings of rim; I I, slot-apertures therein; J, metal ring in channel or groove C.

Although I have shown excrescences on the sides of my molded double-ribbed tread resilient body, I wish it to be understood that if the rubber be forced into a rim, as at present adopted for resilient treads, the excrescences can be dispensed with and the sides of the rubber, after being crowded in, will expand into the slots in the wings and fix itself here and there all around the wheel. In such cases, however, part of the resiliency is destroyed.

What I claim, and desire to secure by Letters Patent, is—

1. In a wheel-tire, the combination of a channeled rim having longitudinal slots, and a resilient body formed integral with lateral excrescences and with two separate tread-ribs, said resilient body lying within the channeled rim and the excrescences which are integral with said resilient body projecting into said longitudinal slots, substantially as and for the purposes described.

2. In a wheel-tire, the combination of a channeled rim having longitudinal slots, a resilient body formed integral with lateral excrescences and with two separate tread-ribs, said resilient body lying within the channeled rim and the excrescences which are integral with said resilient body projecting into said longitudinal slots, and a metal ring inserted between the two tread-ribs of the resilient body to hold said ribs separated, substantially as and for the purposes described.

3. In a wheel-tire, the combination with a channeled rim having side flanges constructed with longitudinal slots, of a resilient body lying in the channeled rim and having elastic portions integral with the body and projecting into the longitudinal slots in the side flanges of the rim, said resilient body having two separate tread-ribs, substantially as and for the purposes described.

In testimony whereof I have hereunto set my hand in presence of two subscribing witnesses.

HAZELWOOD CARMONT.

Witnesses:
HENRY GARDNER,
CHARLES ALFRED GROSSETETO.